Patented Jan. 2, 1945

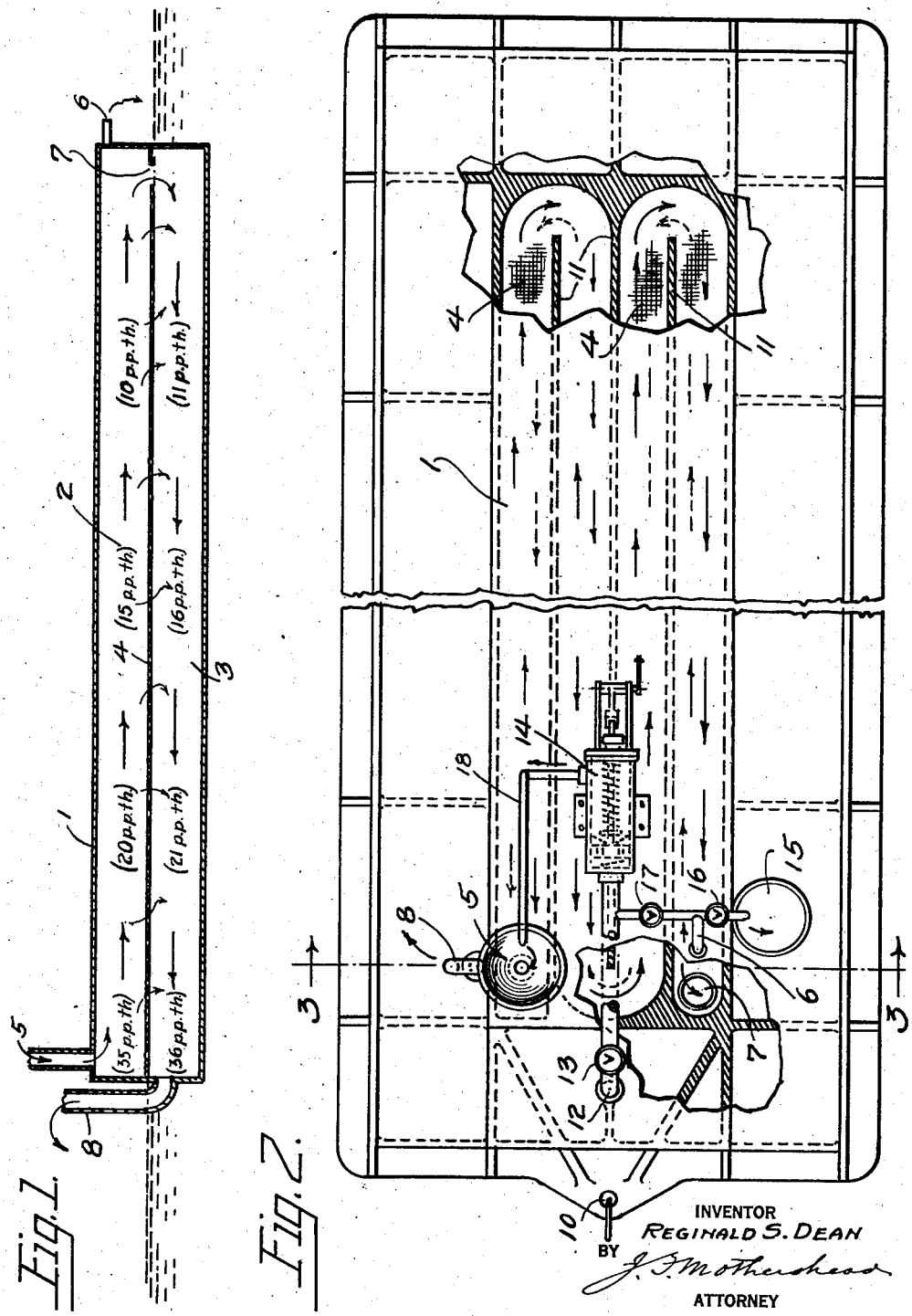

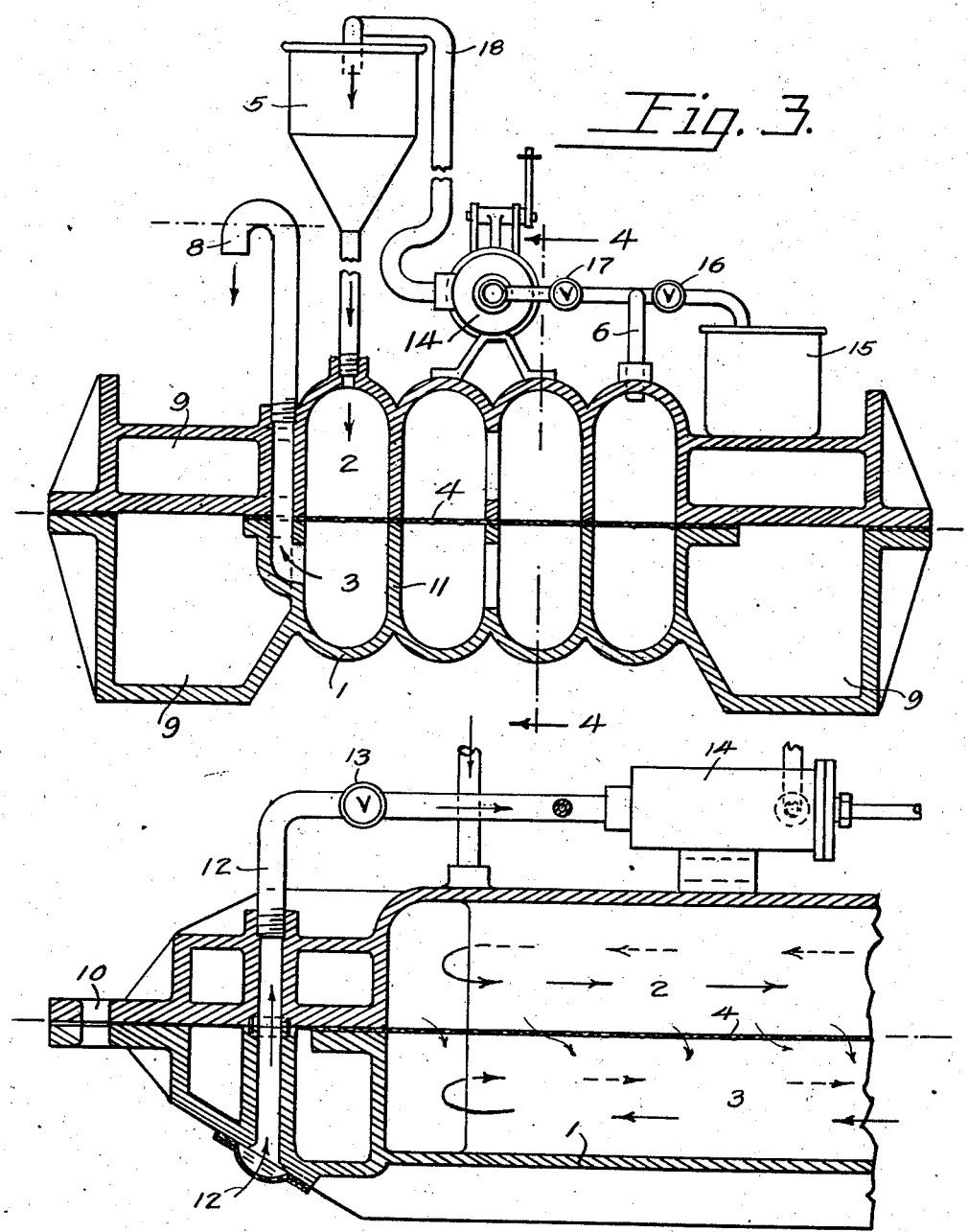

2,366,184

UNITED STATES PATENT OFFICE 2,366,184

PRODUCTION OF POTABLE WATER FROM SALINE SOLUTIONS

Reginald S. Dean, Washington, D. C., assignor to the Government of the United States as represented by the Secretary of the Interior Application March 22, 1944, Serial No. 527,664

7 Claims. (Cl. 210—8.5)

(Granted under the act of March 3, 1883, as amended April 30, 1928; 370 O. G. 757)

This invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of potable water from saline solutions and more particularly to a method and means for reducing the saline content of sea-water to a potable level.

Heretofore, many ways have been proposed for providing shipwrecked mariners and aviators with potable water employing sea-water as a raw material. However, most of these required such a bulky and otherwise inconvenient device as to make it simpler to carry potable water instead of the equipment. It has now been found that sea-water and other aqueous saline solutions can be desalted by a purely physical process employing only the heat of the sun or atmosphere and the cooling effect of the ocean.

Accordingly, it is an object of this invention to produce potable water from unpotable saline solutions, specifically from sea-water, and to provide a practical device for achieving the foregoing.

These objects are accomplished in accordance with this invention wherein water of reduced salt content is produced from aqueous saline solutions by heating and passing such a saline solution in one direction over one side of a permeable diaphragm, then removing and recovering a portion of the water having a reduced salt content and lastly, cooling and passing the remaining solution in an opposite direction over the other side of said diaphragm to purge a saline solution more concentrated than the original solution. It has now been found that a saline solution, especially a relatively dilute saline solution, such as sea-water, can be placed in a container which is heated on one side, cooled on the other and has inter-mixture minimized by a simple permeable diaphragm, and when such a procedure is employed the warm side of the diaphragm soon loses a portion of its saline content by selective migration to the cooler layer of saline solution. Thus, in effect, where a body of saline solution is heated at one portion thereof and cooled at another, a concentration gradient is established between the warm and cold portions thereof, such that the cold portion has a higher salt content than the warm portion. The diaphragm above mentioned acts merely to retard physical admixture by convection currents, and the like, and apparently there is little osmotic effect.

The invention will be made clear by reference to the accompanying drawings forming a part of the specification, and in which:

Figure 1 represents in sectional form a device for reducing the salt content of a saline solution;

Figure 2 represents a plan view partly in section of a different device for de-salting saline solutions;

Figure 3 represents an elevation, partly in section, of the device illustrated in Fig. 2, the section being taken along the line 3—3 of Fig. 2 in the direction shown by the arrows;

Figure 4 represents a partial elevation partially in section at right angles to the view of Fig. 3 and in which the section is taken along the line 4—4 of Fig. 3 in the direction shown by the arrow.

For a practical embodiment of a device for operation in accordance with the present invention, and referring now to Figure 1, there is illustrated an elongated, relatively flat housing 1 supported in the ocean by floats, not shown, in such a manner that an upper chamber 2 is maintained above the surface of the ocean, where it is heated by solar radiation, and a lower chamber 3 is allowed to project into the ocean where it is cooled by indirect heat exchange. The upper chamber 2 is separated throughout most of its length from the lower chamber 3 by a permeable diaphragm 4 which merely serves to retard free intermixture of the contents of the upper chamber 2 and the lower chamber 3. The diaphragm 4 may be made of canvas, cotton duck, rayon or similar materials which are permeable to water but hinder free passage thereof. The housing 1 is provided with an inlet 5 near one end thereof, communicating with the upper chamber 2. Near the other end of the upper chamber 2 is a relatively small overflow outlet 6 to bleed off a relatively small portion of saline solution having a reduced salt content. The diaphragm 4 is provided with an aperture 7 positioned adjacent the overflow outlet 6 in order that the saline solution entering the upper chamber 2 at the inlet 5 shall pass over the diaphragm 4 downward through the aperture 7 and into the lower chamber 3. Communicating with the lower chamber 3 is an outlet 8 positioned near the end of the lower chamber 3 and near the inlet 5, but separated therefrom by the diaphragm 4.

In operation, raw sea-water or other saline solution is introduced into the housing 1 through inlet 5 and passes over the diaphragm 4 traversing the length of the upper chamber 2. As it proceeds, it is warmed by solar radiation or atmospheric heating, and at least a portion of its salt content migrates through the permeable diaphragm 4 into the lower chamber 3. As illustrated in Fig. 1, the initial saline solution suitably has a salt content of 35 parts per thousand by weight which corresponds to a typical analysis of average sea-water. The length of the device is sufficient to produce a pronounced desalting effect and the desalted sea-water is withdrawn through the outlet 6 and recovered. The bulk of the sea-water, after passing over the permeable diaphragm 4 passes through the aperture 7 into the lower chamber 3 and there flows in an opposite direction gradually becoming more concentrated by salt migration through the diaphragm 4, to the outlet 8. While traversing the lower chamber 3, the sea-water is cooled by indirect heat exchange with the sea itself, thus establishing a temperature gradient from the upper chamber 2 through the diaphragm 4 to the lower chamber 3, and by virtue of the previously described physical phenomenon, salt migrates from the upper chamber 2 through the permeable diaphragm 4 into the lower chamber 3, and renders the contents of the lower chamber 3 more concentrated in salt than the contents of the upper chamber 2, thus also establishing a concentration gradient from the upper chamber 2 through the diaphragm 4 into the lower chamber 3. As illustrated in Fig. 1, the concentration gradient at any one point across the diaphragm 4 probably does not exceed 1 part of salt per thousand parts of sea-water. However, employing a sufficiently elongated housing 1, and by properly selecting the rate at which raw sea-water is fed into the inlet 5 and at which partially desalted sea-water is recovered from the overflow outlet 6, practically speaking, the sea-water can be reduced in one passage to a low potable salt content. By providing a single container of sufficient length, desalting can be accomplished in a single pass. Obviously, for convenience, the sea-water can be reduced to a potable salt content in several stages, rather than in one passage. For example, the sea-water can be quickly passed through the device and only a partial reduction to potability be secured, by bleeding off a fairly large portion through the outlet 6. Thereafter, a sufficiently large accumulation of the product from outlet 6 is held in any suitable container and recycled to the inlet 5. When the inlet 5 is fed with sea-water of partially reduced salt content, a still further reduction in salt content is obtained until potability is secured. Another practical way of achieving the same object is to provide a plurality of elongated treatment containers, similar to the device of Fig. 1, and of progressively decreasing capacity, operating them in such fashion that the product from the outlet 6 is employed as a feed for the inlet 5 of the next succeeding treatment container in the series. However, the salt-rich solution from the outlet 8 of the next succeeding treatment container will have a lower content of salt than the raw sea-water, and it should therefore be recycled to a preceding container as make-up feed together with additional feed.

A more elaborate device for employment in accordance with the desalting method of this invention is illustrated in Figures 2, 3 and 4. As shown, the equipment comprises a housing 1 supported by float chambers 9 and a suitable towing connection 10. The housing 1 is shown in the form of an elongated, tortuous passageway proceeding from an inlet 5 positioned at one end of the tortuous upper chamber 2 to an aperture 7. As in Figure 1, the upper chamber 2 is separated from a lower chamber 3 by a permeable diaphragm 4. Separators 11 alternately extending to the ends of the housing 1 provide a tortuous passageway for the upper chamber 2 and also for the lower chamber 3. Near one end of the device is provided a suction inlet 12 through which sea-water passes through a valve 13 and a handpump 14 to the inlet 5, thus feeding the upper chamber 2 with raw sea-water. The sea-water proceeds over the upper portion of the diaphragm 4 until it arrives at the aperture 7 in diaphragm 4 connecting the upper chamber 2 and lower chamber 3. While proceeding along this course, the sea-water is heated by solar radiation or indirect contact with the atmosphere. Positioned adjacent the aperture 7 is an outlet 6 for bleeding off a portion of partially desalted sea-water. The outlet 6 is, however, connected to fill a reservoir 15 and the flow is controlled by a valve 16. When the valve 16 is in the closed position and a recycling valve 17 is in the open position, the partially desalted product is optionally recycled through a return pipe 18 to the inlet 5 through the pump 14. By suitably regulating the pump suction valve 13 and the overflow valve 16 and return valve 17, a portion of fresh sea-water can be used as feed and a portion of partially desalted sea-water can be recycled. Most of the feed water, however, passes from the upper chamber 2 through the aperture 7 into the lower chamber 3 where it abstracts salt through the diaphragm 4 and proceeds in counter current direction along the lower side of the diaphragm 4 to the overflow 8 where it is discharged again to the sea, by which time it has abstracted so much salt through the diaphragm 4 as to be more concentrated than the original feed entering through the inlet 5.

As illustrated, the housing 1 and the float chambers 9 can be constructed of any suitable material, but are preferably made of rubberized fabric suitably provided with reinforcing ribs to permit ready inflation of the float chambers and also permit collapsing of the device when not in use.

Instead of a single raft recovery unit, as illustrated in Figures 2, 3 and 4, a plurality or series of such units can be employed, wherein the sea-water is partially desalted in an initial unit, collected in the reservoir 15, and employed as feed in a similar subsequent unit of similar construction. Thus, with the expenditure of very little labor and employing merely solar radiation and heat exchange with the sea itself, ordinary sea-water can be brought to a low salt content sufficient for potability.

Various changes can be made in the details and equipment described without departing from the spirit and scope of the invention.

What is claimed is:

1. A method of producing water of reduced salt content from aqueous saline solutions which comprises heating and passing such a saline solution in one direction over one side of a permeable diaphragm, removing and recovering a portion of water having a reduced salt content, then cooling and passing the remaining solution in an opposite direction over the other side of said diaphragm to purge a saline solution more concentrated than the original.

2. The method of claim 1 in which the recovered water of reduced salt content is again heated and passed in one direction over a permeable diaphragm, again a portion of water having a still further reduced salt content is removed and recovered, and again the remaining solution is cooled and passed in an opposite direction over the other side of the permeable diaphragm.

3. A method of producing potable water from sea-water which comprises heating and passing sea-water in one direction over one side of a permeable diaphragm, removing and recovering a portion of water having a reduced salt content, then cooling and passing the remaining solution in an opposite direction over the other side of said diaphragm to purge a saline solution more concentrated than the feed sea-water.

4. A method of producing potable water from sea-water which comprises slowly passing sea-water in one direction over one side of an elongated permeable diaphragm while heating said sea-water by solar radiation, removing and recovering a portion of water having a reduced salt content, then slowly passing the remaining solution in an opposite direction over the other side of said elongated diaphragm while cooling said solution by indirect heat exchange with the sea itself, to purge a saline solution more concentrated than the feed sea-water.

5. A cyclic method of producing potable water from sea-water which comprising heating and passing sea-water in one direction over one side of a first permeable diaphragm, removing a first recovered portion of water having a reduced salt content, then cooling and passing the residual solution in an opposite direction over the other side of said first permeable diaphragm to purge and discard a primary saline solution more concentrated than the feed sea-water, then heating and passing said first recovered portion of water in one direction over one side of a second permeable diaphragm, removing a second recovered portion of water having a lower salt content than said first recovered portion of water, thereafter cooling and passing the second residual solution in an opposite direction over the other side of said second permeable diaphragm to purge a secondary saline solution more concentrated than said first recovered water portion but less concentrated than the feed sea-water, returning said secondary purged saline solution as make-up feed for said first permeable diaphragm together with fresh sea-water, and heating and passing said recovered portion of water to succeeding permeable diaphragms as before while employing the purge from each diaphragm as make-up feed for the next preceding diaphragm, until the ultimate recovered water portion has attained a desired minimum salinity.

6. A device for producing potable water from sea-water which comprises a closed container provided with a permeable diaphragm dividing said container into a plurality of chambers, inlet means for introducing sea-water into said container, means for heating one chamber, means for cooling another chamber, outlet means for discarding highly salted sea-water from the cooled chamber, and over-flow means for recovering at least partially desalted sea-water from said heated chamber.

7. A device of the character described comprising a closed elongated container having a permeable diaphragm therein defining an upper chamber and a lower chamber, an inlet in said upper chamber adjacent one end of said diaphragm, an overflow adjacent the other end of said diaphragm, an outlet in said lower chamber adjacent said inlet but separated therefrom by said diaphragm, means for heating said upper chamber, means for cooling said lower chamber, and means adjacent said overflow remote from said inlet for conducting the contents of the upper chamber to the lower chamber whereby in operation sea-water passes first across the upper side of said diaphragm while being heated, then across the lower side of said diaphragm while being cooled, a portion of the salt content migrates through said permeable diaphragm and a portion of at least partially desalted water is bled off from said over-flow.

REGINALD S. DEAN.